US010169198B2

(12) United States Patent
Mulder et al.

(10) Patent No.: US 10,169,198 B2
(45) Date of Patent: *Jan. 1, 2019

(54) AGGREGATING DATA FOR DEBUGGING SOFTWARE

(71) Applicant: International Business Machines Corporation, Armonk, NY (US)

(72) Inventors: James H. Mulder, Wappingers Falls, NY (US); Purvi S. Patel, Rock Hill, SC (US); Patrice Salone, Clintondale, NY (US); Ralph A. Sharpe, Newburgh, NY (US); Girija Varanasi, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/494,649

(22) Filed: Apr. 24, 2017

(65) Prior Publication Data

US 2018/0307585 A1 Oct. 25, 2018

(51) Int. Cl.
*G06F 9/44* (2018.01)
*G06F 11/36* (2006.01)
*G06F 3/06* (2006.01)

(52) U.S. Cl.
CPC .......... *G06F 11/3636* (2013.01); *G06F 3/065* (2013.01); *G06F 3/067* (2013.01); *G06F 3/0619* (2013.01)

(58) Field of Classification Search
CPC ........ G06F 3/0619; G06F 3/065; G06F 3/067; G06F 11/3636

USPC ................................................ 717/124–133
See application file for complete search history.

(56) References Cited

U.S. PATENT DOCUMENTS

| | | | |
|---|---|---|---|
| 6,226,761 B1 | 5/2001 | Berstis | |
| 7,281,163 B2 * | 10/2007 | Brown | G06F 11/0748 709/216 |
| 7,383,471 B2 * | 6/2008 | Dall | G06F 11/3636 714/38.11 |
| 8,151,143 B2 | 4/2012 | Li et al. | |
| 8,453,015 B2 * | 5/2013 | Ponnuswamy | G06F 11/0778 714/38.11 |
| 8,739,133 B2 | 5/2014 | Gritter et al. | |
| (Continued) | | | |

OTHER PUBLICATIONS

Mulder, et al., "Aggregating Data for Debugging Software", U.S. Appl. No. 15/794,076, filed Oct. 26, 2017.

(Continued)

*Primary Examiner* — Ted T. Vo
(74) *Attorney, Agent, or Firm* — Daniel R. Simek

(57) ABSTRACT

A method for obtaining data to debug an issue that affects a software application. In an embodiment, the method includes at least one computer processor receiving a request to obtain data associated with an issue that affects an executing software application. The method further includes determining a set of memory spaces utilized by the executing software application and one or more processes supporting the executing software application. The method further includes initiating a dump function to obtain data within the memory spaces of the determined set of memory spaces. The method further includes storing the data related to the dumped set of memory spaces by (i) high-speed capture and aggregation of data to volatile memory and (ii) spooling data within volatile memory to persistent memory for storage.

17 Claims, 4 Drawing Sheets

(56) References Cited

U.S. PATENT DOCUMENTS

| | | | |
|---|---|---|---|
| 8,949,800 | B2 | 2/2015 | Masser et al. |
| 8,972,793 | B2 | 3/2015 | Cho |
| 9,223,681 | B2 | 12/2015 | Delporte |
| 9,575,871 | B2 | 2/2017 | Wisnovsky |
| 9,672,091 | B2 | 6/2017 | Singaravelu Vanaja et al. |
| 9,696,926 | B2 * | 7/2017 | Harman ............... G06F 3/0619 |
| 9,740,594 | B2 | 8/2017 | Delporte |
| 2004/0162978 | A1 | 8/2004 | Reasor et al. |
| 2010/0192132 | A1 | 7/2010 | Yuan et al. |
| 2010/0218188 | A1 | 8/2010 | Jackson et al. |
| 2012/0311312 | A1 | 12/2012 | Hameed |
| 2013/0290789 | A1 | 10/2013 | Wen |
| 2014/0006874 | A1 | 1/2014 | Bohling et al. |
| 2014/0006877 | A1 | 1/2014 | Zhu et al. |
| 2014/0040669 | A1 | 2/2014 | Davis et al. |
| 2014/0109064 | A1 | 4/2014 | Gritter et al. |
| 2015/0121135 | A1 | 4/2015 | Pape |
| 2015/0248564 | A1 | 9/2015 | Feng et al. |
| 2016/0055043 | A1 | 2/2016 | Chikabelapur et al. |
| 2016/0140014 | A1 | 5/2016 | Lampert et al. |
| 2016/0364169 | A1 | 12/2016 | Patel et al. |
| 2016/0364317 | A1 | 12/2016 | Rehman et al. |
| 2017/0286111 | A1 | 10/2017 | Pereira et al. |
| 2017/0357564 | A1 | 12/2017 | Plicanic Samuelsson et al. |
| 2017/0371769 | A1 | 12/2017 | Merten et al. |

OTHER PUBLICATIONS

Connolly et al., "WebSphere on z/OS-Optimized Local Adapters," IBM Redpaper, Aug. 2009, 124 pages.

Jayathirtha, "Oracle Database System Administration Guide, 10g Release 2 (10.2. 0.5) for IBM z/OS on System z B25398-04," Oracle, Oct. 2012, 260 pages.

Singh et al. "Security on the IBM Mainframe," IBM Redbooks, Apr. 2010, 294 pages.

Dong H. Ahn, Scalable Temporal Order Analysis for Large Scale Debugging, 2009, pp. 1-11. ftp://ftp.cs.wisc.edu/paradyn/papers/Miller09ScalableDebugging.pdf (Year: 2009).

James Campbell, Real-Time Trace: A Better Way to Debug Embedded Applications, 2014, pp. 1-9. http://www.ashling.com/wp-content/uploads/Real-time_trace_a_better_way_to_debug_embedded_applications.pdf (Year: 2014).

Microsoft, Debugging Stack Traces from Crash Dumps, Mar. 15, 2017, pp. 1-14 https://github.com/Microsoft/WinObjC/wiki/Debugging-Stack-T races-from-Crash-Dumps (Year: 2017).

Weidong Cui, RETracer: Triaging Crashes by Reverse Execution from Partial Memory Dumps, 2016, pp. 820-829. https://cs.brown.edu/-vpk/papers/retracer.icse16.pdf (Year: 2016).

Praven Tammana, Simplifying Datacenter Network Debugging with PathDump, 2016, pp. 1-14. http://www.cs.cornell.edu/-ragarwal/pubs/pathdump.pdf (Year: 2016).

XenApp, Collecting the UMDH Logs and User Dump Files for Memory Leaking Processes, 2015, pp. 1-7. https://support.citrix.com/article/CTX120596 (Year: 2015).

Jihyung Lee, FloSIS: A Highly Scalable Network Flow Capture System for Fast Retrieval and Storage Efficiency, 2015, pp. 1-14. https://www.usenix.org/system/files/conference/atc15/atc15-paper-lee-jihyung.pdf (Year: 2015.

List of IBM Patents or Patent Applications Treated as Related, Appendix P, Filed May 14, 2018, 2 pages.

* cited by examiner

AGGREGATING DATA FOR DEBUGGING SOFTWARE

BACKGROUND OF THE INVENTION

The present invention relates generally to the field debugging software applications, and more particularly to identifying and collecting data for analysis of non-fatal abnormalities that occur during the execution of a software application.

A software application may be comprised of a plurality of modules, environments, executable files, and dynamically linked libraries that execute within one or more memory spaces. A software application can drive a number of end-user programs to perform a group of coordinated functions tasks, and/or activities for the benefit of the users of a computing system. A software application may also access data from various sources and other computing systems (e.g., storage systems). During the development, testing, and deployment of a software application, users of a software application may encounter various problems and inconsistencies during the execution of a software application. Some problems are internal to the software application. Other problems experienced by the software application can be related to interactions with other software and/or system issues. Various data dumps and system logs can be supplied to the developers of the software application to debug the software application.

With the advent of networked computing, grid computing, and cloud computing large computing applications, such as e-commerce apps, financial apps, medical apps, and enterprise apps often do not entirely execute within a single physical computer. Aspects of a software application can be distributed (e.g., hosted) among virtualized entities of one or more computing systems that are optimized for various functions, such as computational speed, transaction processing, database queries and updates, and Web services. In addition, some capabilities of a data center are purchased as: services, software, and/or platform service offerings by a user. As such, a developer of a software application can utilize various application programming interfaces (APIs) and middleware offered by the data center as opposed to coding all aspects of a software app. The developer of a software application may request manual intervention by an operator, a technician, and/or an administrator of the data center to obtain data (e.g., memory and log dumps) related to the operations, hangs, and/or faults that occur during the execution of the software app.

SUMMARY

According to aspects of the present invention, there is a method, computer program product, and/or system for obtaining data to debug an issue that affects a software application. In an embodiment, the method includes one or more computer processors receiving a request to obtain data associated with an issue that affects an executing software application. The method further includes determining a set of memory spaces utilized by the executing software application and one or more processes supporting the executing software application. The method further includes initiating a dump function to obtain data within the memory spaces of the determined set of memory spaces. The method further includes storing the data related to the dumped set of memory spaces. Where storing the data related to the dumped set of memory spaces includes (i) high-speed capture and aggregation of data to volatile memory and (ii) spooling data within volatile memory to persistent memory.

DETAILED DESCRIPTION

Figure 1:
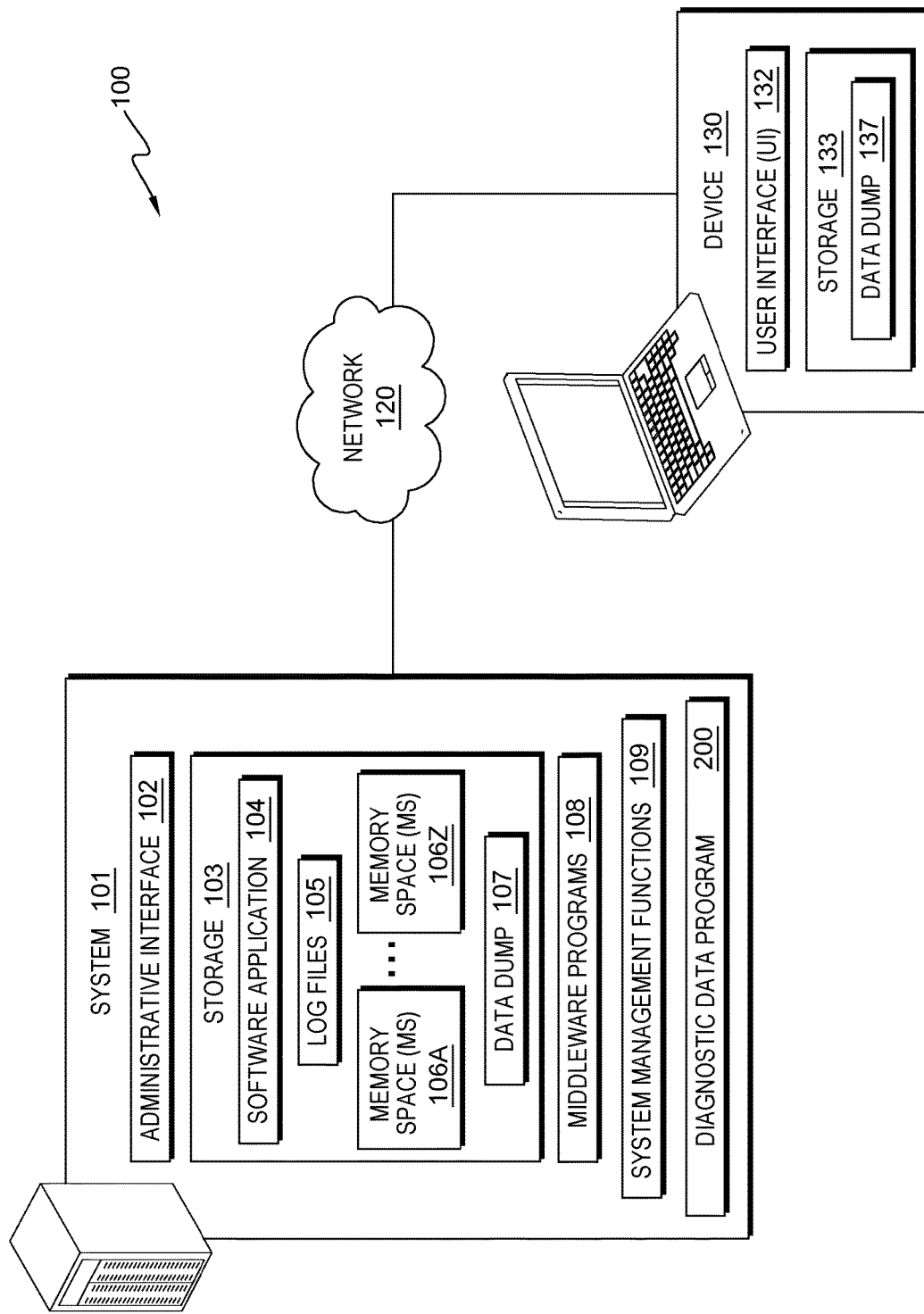
FIG. 1 illustrates a computing environment, in accordance with an embodiment of the present invention.

Embodiments of the present invention recognize that an operating system (OS), system monitoring software, and system management software can capture data while a computing system is running and hosting the execution of a plurality of software applications. Various functions can trace and log the status of processes (e.g., services, software applications, communication applications, hardware operations, etc.) while a system is utilized by the plurality of hosted software applications. A fatal error (e.g., an abend, a fatal exception error, etc.) and some non-fatal errors can occur during the execution of a software application resulting in a condition that is automatically detectable within the computing system. A computing system can include numerous automatic functions that can initiate dumps of data in response to a fatal error. For example, a system problem management function can generate a first failure data capture (FFDC) that includes a dump and other job/system related data. The dumped data is utilized to diagnose and debug problems in software applications and/or the operations of a computing system. Some dumps can be limited to the execution environment of a single software application. Other dumps can obtain system-wide data related to a fatal error.

Embodiments of the present invention recognize that some non-fatal errors and abnormalities that occur during the execution of a software application may not generate automatic dumps of data to aid in analyzing and debugging the non-fatal error. In addition, embodiments of the present recognize that a class of errors exists that is not detected by or recognized by the software of a computing system. Some such errors are attributable to factors outside of the code of the software application, such as middleware issues, operating system services, and interactions with one or more hardware elements (e.g., device drivers) within a computing system. Non-fatal errors, such as hangs, poor performance, stuck in a loop, data loss, data corruption, and/or a class of errors not detected or recognized by the software of a computing system; are herein referred to as issues that affect a software application. When an issue affecting a software application problem is undetected by the software of a computing system, the administrator of the computing system can respond by manually initiating a dump to collect diagnostic data.

A user/developer/owner of a software application may request dumps of data in response to events or issues, which occur during the execution of the software application. In some scenarios, a technician, an operator, a system programmer, or an administrator of the computing system, herein referred to as an administrator, initiates dumps of data in response to a request from a developer of a software application. In other scenarios, an administrator of the computing system initiates dumps in response to a group of users of the computing system identifying issues related to the computing system. Alternatively, an administrator of the computing system initiates dumps based on observing the operational states of the computing system or based on messages generated by one or more monitoring programs of the computing system.

Embodiments of the present invention also recognize that some computing systems are comprised of a plurality of virtualized computing resources and virtualized computing entities, such as servers. Within a virtualized computing system, different computing entities, such as logical partitions (LPARs), can utilize different operating systems; and that the tasks, processes, executable functions, and other aspects of a software application can be distributed among various memory spaces allocated to a software application by the virtualized computing system. In addition, a developer of a software application is not required to code every aspect of the software application.

The computer system that hosts a software application may provide various services, middleware, and tasks (e.g., ancillary processes) that are accessed by the software application. As such, a virtualized computing system (e.g., a mainframe computer) may track the processes of a software application and the processes, such as operating system services, kernel tasks, daemons, and/or middleware utilized by the software application by unique identifiers. For example, a process identifier (PID) can be a number or job name utilized by an operating system kernel to uniquely identify a scheduled process and/or an active process. One or more PIDs are available within a memory space and may execute or be scheduled to execute within the memory space. As with PIDs, memory spaces within a virtualized computing system can be uniquely identified (e.g., reference), such as by address space identifiers (ASIDs). In some embodiments of the present invention, the terms ASID and memory space can be used interchangeably.

Unless further specified in a dump request, only the ASIDs of a software application or an identified system service are dumped. For example, the ASID of the parent process that calls a service associated with a dump request are not automatically identified, captured, and dumped. Similarly, the ASIDs of the child processes called by a software application associated with a dump request are not automatically identified, captured, and dumped. Thus, analyzing and debugging issues affecting a software program can be iterative and laborious. In one example, a user identifies that one or more ASIDs associated with a software application that is hung, and requests a dump of the one or more ASIDs. In response, an administrator of a computing system initiates a request to dump of one or more identified ASIDs. A debugger (e.g., an application developer) utilizes the output of one or more dump requests to identify other ASIDs and associated PIDs that may contribute to the issues that affect the software application. Subsequently, the software application is rerun, and the newly identified PIDs and corresponding ASID are included in the next dump request. The debug process is repeated until the user obtains the data to correct the issues affecting the software application.

Embodiments of the present invention increase the ability to collect more relevant data related to issues affecting a software application invocation, as opposed to a person iteratively collecting data related to issues affecting the software application invocation. Embodiments of the present invention utilize various relationships among processes, services, middleware programs, and tasks to determine a larger number of memory spaces (e.g., ASID) of interest. The larger number of memory spaces are dumped in response to a request to obtain data to more thoroughly diagnose (e.g., analyze and debug) a software application. Embodiments of the present invention utilize relationships between processes, such as cross-memory relationships or process trees, to identify additional memory spaces to automatically include in a dump of data.

Other embodiments of the present invention utilize relationships among executing services of a computing system to identify the additional memory spaces to automatically include in a dump. For example, if users of different software applications report related problems, then an administrator of the computing system can formulate a dump request based on observations of the user. The administrator can begin with one group of processes and memory spaces and automatically expand the scope to identify additional memory spaces and/or find other processes executing within shared memory spaces.

Some embodiments of the present invention can constrain (e.g., dictate) the scope or size of a dump of memory spaces. In an example, the scope for identifying memory spaces may be constrained to three levels (e.g., parent processes, child processes, grandchild processes), 2-degrees removed, etc. In another example, if a cross-memory relationship is identified for an orphan process (e.g., a PID) by a memory cataloging function (not shown), then the orphan process and corresponding ASID may be excluded from the memory spaces to be dumped. In another example, if a system management function of a computing system determines that the size of the aggregate dump file is approaching a size that impacts the performance of the system for other users, then one or more in-progress dump services can be cancelled or the scope of memory space identification may be truncated.

Further embodiments of the present invention can identify memory spaces of interest for a dump based on identifying relationships other than cross-memory relationships. In one example, the provisioning information associated with a memory space may be analyzed to identify other processes and corresponding memory spaces that are unrelated to a software application but can affect the process utilized by the software application. In this example, processes not utilized by the software application, by virtue of their provisioning, may be over-utilizing computing resource and "starving" the processes utilized by the software application. In another example, other relationships and interactions between memory spaces may be associated with internal calls (e.g., software emulation as opposed to direct hardware processing), component interfaces, physical device drivers, virtual device drivers, storage tier assignments, ancillary services, etc. that are not directly utilized by a software application or a service within a computing system. In some instances, such relationships and interactions between memory spaces can introduce issues that affect a software application and degrade performance of the software application.

Further, embodiments of the present invention provide beneficial capabilities to the users and developers of a software application by identifying additional memory spaces utilizing cross-memory relationships and relationships between processes, tasks, and services utilized by a software application. In addition, identifying additional memory spaces utilizing cross-memory relationships and relationships between other processes, tasks, and services of a computing system is beneficial for administrators of the computing system. As such, automatically identifying and dumping additional memory spaces and obtaining data to debug of a software application is seen to be improved in at least these aspects. Similarly, automatically identifying and dumping additional memory spaces and obtaining data to debug of issues within a computing system, operations of the computer system are seen to be improved in at least these aspects.

The present invention will now be described in detail with reference to the Figures. FIG. 1 is a functional block diagram illustrating computing environment 100, in accordance with an embodiment of the present invention. In an embodiment, networked computing environment 100 includes: system 101 and device 130 interconnected over network 120. In some embodiments, computing environment 100 is representative of a virtualized computing environment, such as within a mainframe computer (e.g., a "big-iron" system). In other embodiments, computing environment 100 is representative of a networked computing environment. In various embodiments, computing environment 100 is representative of a combination of architectures supporting a plurality of instances of system 101, such as within a data center. Many modifications to the depicted environment may be made by those skilled in the art without departing from the scope of the invention as recited by the claims.

System 101 and device 130 may be: laptop computers, tablet computers, netbook computers, personal computers (PC), desktop computers, personal digital assistants (PDA), smart phones, wearable devices (e.g., digital eyeglasses, smart glasses, smart watches, smart televisions, etc.), or any programmable computer systems known in the art. In certain embodiments, system 101 and device 130 represent computer systems utilizing clustered computers and components (e.g., database server computers, application server computers, etc.) that act as a single pool of seamless resources when accessed through network 120, as is common in data centers and associated with cloud-computing applications.

In general, system 101 and device 130 are representative of any programmable electronic device or combination of programmable electronic devices capable of executing machine-readable program instructions and communicating with users of system 101 and device 130, via network 120. System 101 and device 130 may include components, as depicted and described in further detail with respect to FIG. 4, in accordance with embodiments of the present invention.

In various embodiments, system 101 is representative of a virtualized computing system that can include a plurality of physical, virtualized, and/or paravirtualized computing entities; and can be configured to produce various execution environments. In one embodiment, system 101 is representative of a single LPAR to host a software application. In another embodiment, system 101 is representative of a plurality of LPARs to host various aspects of a software application. In some embodiments, system 101 is representative of a large computing system (e.g., a computing node) or group of computing systems configured to support an enterprise software application or host software application for a plurality of customers.

System 101 includes: administrative interface 102, storage 103, middleware programs 108, system management functions 109, and diagnostic data program 200. In some embodiments, system 101 accesses one or more computing programs and/or databases that are network accessible and are utilized by one or more embodiments of the present invention and/or the execution of software application 104. In an example, system 101 may have a license to access a virtual engineering program and/or one or more analytics programs as-a-service via a cloud-service provider.

Administrative interface 102 is representative of one or more control consoles associated with system 101 that include input and display capabilities. In one embodiment, administrative interface 102 provides command line input and control of system 101. In another embodiment, administrative interface 102 may be a graphical user interface (GUI) or a web user interface (WUI), and administrative interface 102 can display text, documents, forms, web browser windows, user options, application interfaces, and instructions for operation, and include the information, such as graphic, text, and sound that a program presents to an administrator of system 101. Administrative interface 102 may include a plurality of windows for viewing and/or inputting information to system 101. For example, administrative interface 102 may include a plurality of dashboards depicting the operations and key performance indicators of system 101, and sending messages to and receiving messages from users of system 101.

In addition, administrative interface 102 controls sequences/actions that an administrator of system 101 utilizes to input requests for data to diagnostic data program 200. In various embodiments, administrative interface 102 displays one or more icons representing applications that a user can execute via network 120, such as diagnostic data program 200 and various programs (not shown) of system 101 and/or other computing systems accessible via network 120. In addition, administrative interface 102 can control sequences of actions that the user utilizes to respond and/or confirms actions associated with diagnostic data program 200 and/or system management functions 109.

In some embodiments, an administrator of system 101 can interact with administrative interface 102 via a singular device, such as a touch screen (e.g., display), that performs both input to a GUI/WUI, and as an output device (e.g., a display) presenting a plurality of icons associated with apps and/or images depicting one or more executing software applications. In other embodiments, one or more aspects of system management functions 109 can generate administrative interface 102 operating within system 101. Administrative interface 102 may accept input from a plurality of input/output (I/O) devices (not shown) including, but not limited to, a tactile sensor interface (e.g., a touch screen, a touchpad) or a natural user interface (e.g., voice control unit, motion capture device, eye tracking, cyberglove, head-up display etc.). In addition to the audio and visual interactions, administrative interface 102 may receive input in response to an administrator of system 101 utilizing natural language, such as written words or spoken words, that system 101 identifies as information and/or commands.

Storage 103 includes software application 104, log files 105, memory spaces (MS) 106A thru 106Z, and data dump 107. In one embodiment, storage 103 includes volatile memory, such as random-access memory and non-volatile memory (e.g., storage-class memory, persistent storage, etc.), such as flash memory, solid-state drives, hard-disk drives, and magnetic tapes. In some embodiments, the resources of storage 103 change in response to the execution environment of system 101. In one example, if system 101 is representative of an LPAR, then storage 103 is provisioned by a hypervisor (not shown) and may include virtualized storage entities. In another example, if system 101 is representative of a computing node, then storage 103 may be comprised of physical storage entities.

Storage 103 includes various programs and data. In one embodiment, storage 103 may also include various programs and/or databases, such as but not limited to: a hypervisor, one or more operating systems (e.g., a host OS, various guest OSs), a file management program, a database management system, communication protocols, etc. (not shown) utilized by system 101. Storage 103 also includes various services, functions, and application programming interfaces (APIs) utilized by software applications that execute on system 101. In various embodiments, storage 103 includes the data, source code, libraries, and binary files utilized by software application 104; data utilized by diagnostic data program 200, such as a catalog of active memory spaces and associated PIDs; and/or data within requests to dump data. In one scenario, storage 103 includes an in-progress summary report (not shown) for a received request to perform a dump of data. Upon completion of a request to dump data, the summary log is removed from general storage within storage 103 and included in data dump 107. In some scenarios, a copy of the summary report for a request to dump data is included in a historical log of dump request within log files 105.

Software application 104 includes one or more versions of a software application. In one embodiment, software application 104 is comprised of a plurality of executable and/or interpretable files. Software application 104 may also include module, libraries, and binary files. In some embodiments, software application 104 is an enterprise application that includes and/or interfaces with a plurality of other software applications. In an example, an e-commerce software application may utilize a web server, a DNS name server, a database program, an e-mail program, a transaction-processing program, and a security program (e.g., a firewall, an authentication program, etc.). In various embodiments, during the execution of software application 104, software application 104 calls one or more APIs, services, or middleware programs installed on system 101.

Log files 105 include various logs associated with the operations system 101, one or more functions (not shown) monitoring system 101, and/or monitoring the execution of one or more applications hosted on system 101. Examples of files included within log files 105 include error logs, message logs, system logs, event logs, transaction logs, and process traces. In some embodiments, one or more files within log files 105 are based on encoded data that is not readable by humans without parsing, conversion, and/or interpretation (e.g., post-processing). In addition, some data of log files 105 is structured as records in volatile memory. In various embodiments, the data within log files 105 is stored to persistent storage within storage 103 as files. As records, data within one file of log files 105 can be related to other data within another file of log files 105. In an embodiment, log files 105 include a dump summary log (not shown). The dump summary log includes a plurality of dump summary reports for historical requests to dump data to diagnose software applications and/or system 101. Diagnostic data program 200 can generate dump summary reports.

Memory space (MS) 106A thru 106Z are areas of physical and/or virtualized memory of system 101 that are utilized by a plurality of service and processes, such as software application 104 and middleware programs 108. In some embodiments, an instance of MS 106 is allocated from volatile memory of storage 103 in response to a service or program initiating. If a service is utilized by one or more users, other software applications, or other services, then the instance of MS 106 persists. However, some processes and programs can dynamically establish and revoke access to another process and temporarily link (e.g., share) memory spaces. Therefore, some shared memory (e.g., cross-memory) spaces may not be identified based on the timing (e.g., execution sequence) and interactions between processes. In some scenarios, an instance of MS 106 remains allocated but not accessed (e.g., linked). In other scenarios, if the process within the instance of MS 106 is terminated in response to revoking the link to the process, then the memory of the instance of MS 106 is released to the pool of memory of system 101 (e.g., a portion of storage 103).

Data dump 107 is a snapshot of the data in memory at a point in time when a dump request initiates. Data dump 107 may include user data, portions of the operating system, in process data, and code (e.g., compiled code, binary code, interpretable code, etc.) of an executing service, function, or program. In some embodiments, data dump 107 is encoded data that is not readable by humans without post processing. In addition, some of data dump 107 is structured as records. In one embodiment, data dump 107 includes data associated with diagnosing the execution of software application 104. In another embodiment, data dump 107 includes data associated with diagnosing the execution and/or operations of one or more aspects of system 101, such as the operations of one or more programs of middleware programs 108, or one or more services utilized by users of system 101. In various embodiments, data dump 107 includes data associated with the hardware of system 101.

Middleware programs 108 include one or more programs, services, and/or protocols that connects software components and/or enterprise applications. Some middleware programs 108 utilize APIs to interface with software applications and/or components. Middleware programs 108 are included in the infrastructure, which facilitates creation of business applications; provides core services, such as concurrency, transactions, threading, and messaging; and a software communication architecture for service-oriented architecture applications. Middleware programs 108 enable communication and management of data within distributed software applications. Middleware programs 108 may include Web servers, application servers, content management systems, and a customer information control system (CICS®). Other middleware services are associated with clustering, security, logging, and monitoring.

System management functions 109 includes a plurality of services, functions, tasks, and programs utilized to monitor, administer, and utilize system 101. System management functions 109 includes services, functions, tasks, and programs that manage software execution (e.g., workloads), access log files, control resource allocations, trace executing processes, assist configuring servers, managing access and security policies, etc. System management functions 109 also includes services, functions, tasks, and programs for cataloging memory spaces, identifying cross-memory relationships, and performing dumps of memory spaces. In some embodiments, an administrator of system 101 utilizes various windows associated with administrative interface 102 to access one or more services, functions, tasks, or programs of system management functions 109. In various embodiments, a service, a function, a task, or a program of system management functions 109 generates another window, such as a dashboard within a portion of administrative interface 102.

Diagnostic data program 200 is a program that determines memory spaces related to a request to obtain data by utilizing a dump function, service, or program. In an embodiment, diagnostic data program 200 identifies memory spaces allocated within a computing system by ASIDs. Diagnostic data program 200 can determine shared memory spaces and corresponding ASIDs (e.g., references) based on cross-memory relationships and/or by relationship among programs, services, and middleware executing within a computing system. Diagnostic data program 200 can initiate dumps of the determined memory spaces to obtain user-level data, system-level data, or a combination thereof. In one embodiment, diagnostic data program 200 is utilized to obtain data to diagnose issues (e.g., non-fatal behaviors and abnormality) that occur during the execution of a software application. In another embodiment, diagnostic data program 200 is utilized to obtain data to diagnose issues and degradations of performance that occur during the operations of a computing system.

In some embodiments, diagnostic data program 200 aggregates and filters the determined ASIDs of memory spaces associated with a received request to dump data. In addition, diagnostic data program 200 can generate a summary report of the processes (e.g., PIDs), ASIDs of memory spaces, and data from various log files that are included in the data dump associated with a received request to dump data.

In one embodiment, system 101 communicates through network 120 to device 130. In some embodiments, system 101 communicates with one or more other computing systems and/or computing resources (not shown), such as a web server, an e-mail server, a storage area network (SAN), etc. via network 120. Network 120 can be, for example, a local area network (LAN), a telecommunications network, a wireless local area network (WLAN), such as an intranet, a wide area network (WAN), such as the Internet, or any combination of the previous and can include wired, wireless, or fiber optic connections. In general, network 120 can be any combination of connections and protocols that will support communications between system 101 and device 130, in accordance with embodiments of the present invention. In various embodiments, network 120 operates locally via wired, wireless, or optical connections and can be any combination of connections and protocols (e.g., personal area network (PAN), near field communication (NFC), laser, infrared, ultrasonic, etc.).

Device 130 includes User Interface (UI) 132 and storage 133. Storage 133 includes various programs and data (not shown) and data dump 137. Examples of programs and data that device 130 may include are: an operating system, a web browser, an integrated development environment, one or more versions of software application 104 (e.g., source code, compiled code, etc.), a communication program, a data decompression program, and certificates and security information to access system 101. Data dump 137 is representative of an instance of data dump 107 that is transferred to device 130 for off-line analysis and debug of software application 104.

In one embodiment, UI 132 may be a graphical user interface (GUI) or a web user interface (WUI), and UI 132 can display text, documents, forms, web browser windows, user options, application interfaces, and instructions for operation, and include the information, such as graphic, text, and sound that a program presents to a user. UI 132 enables a user (e.g., a software developer) of device 130 to communicate with system 101 via network 120. UI 132 can initiate the execution of an instance of software application 104 and in response view the results of user interactions with software application 104, such as submitting a request to check inventory and receiving the results of the inventory check. In addition, a user of device 130 can use UI 132 to communicate, with an administrator of system 101, a request to obtain a dump of data.

In some embodiments, a user of device 130 can interact with UI 132 via a singular device, such as a touch screen (e.g., display) that performs both input to a GUI/WUI, and as an output device (e.g., a display) presenting a plurality of icons associated with apps and/or images depicting one or more executing software applications. In other embodiments, a software program (e.g., a web browser) can generate UI 132 operating within the GUI environment of device 130. UI 132 accepts input from a plurality of input/output (I/O) devices (not shown) including, but not limited to, a tactile sensor interface (e.g., a touch screen, a touchpad) or a natural user interface (e.g., voice control unit, motion capture device, eye tracking, cyberglove, head-up display etc.). In addition to the audio and visual interactions, UI 132 may receive input in response to a user of device 130 utilizing natural language, such as written words or spoken words, that device 130 identifies as information and/or commands.

Figure 2:
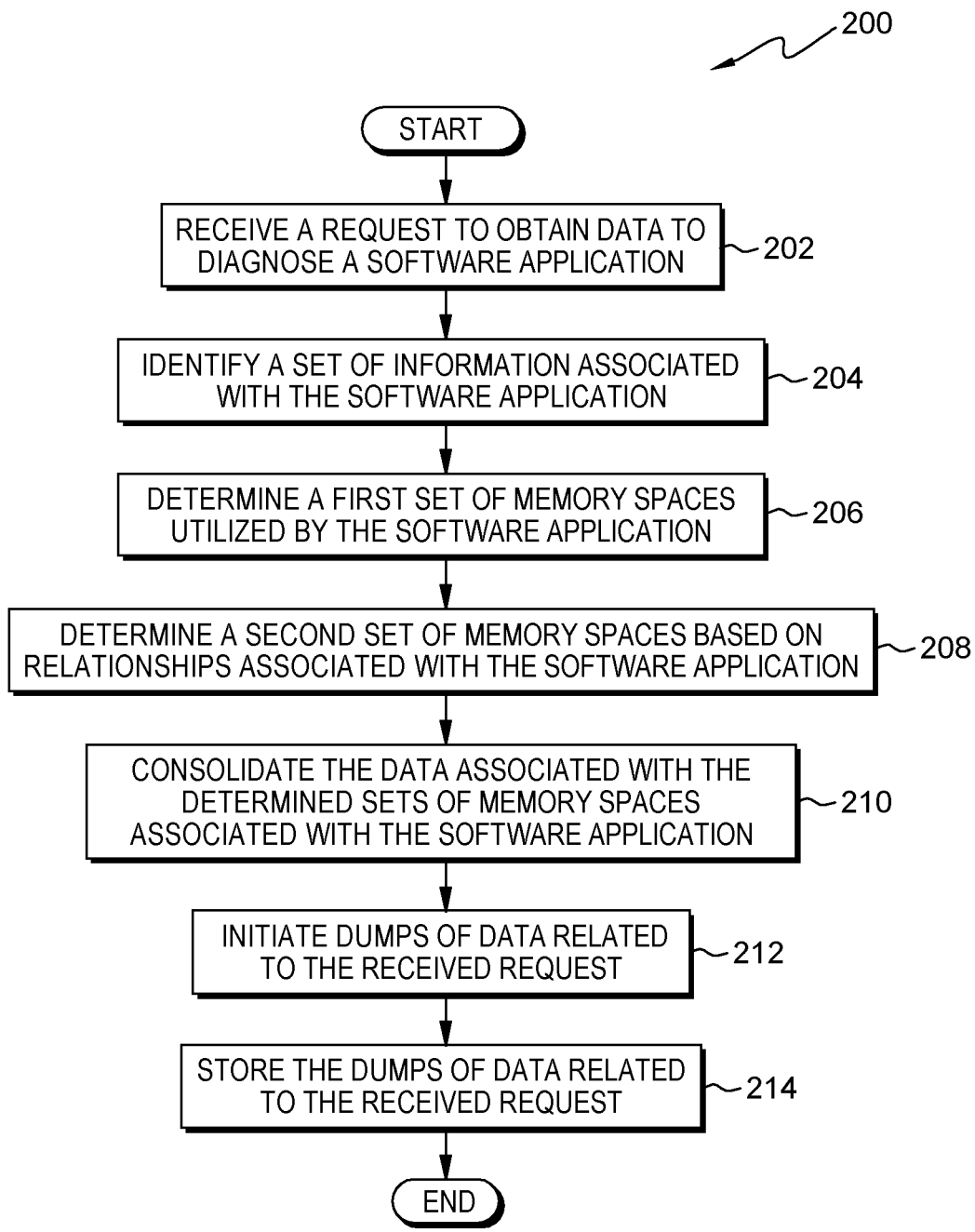
FIG. 2 depicts a flowchart of the operational steps of a diagnostic data program, in accordance with an embodiment of the present invention.

FIG. 2 is a flowchart depicting operational steps for diagnostic data program 200, a program that generates dumps of data based on one or more relationships among memory spaces and/or executing processes during the operation of a computing system, in accordance with embodiments of the present invention. In one embodiment, diagnostic data program 200 identifies memory spaces associated with an executing software application that have various cross-memory relationships with one or more services, tasks, API, etc. utilized by the executing software application. In some embodiments, multiple instances of diagnostic data program 200 can execute concurrently within the same computing system or virtualized computing environment. In various embodiments, diagnostic data program 200 consolidates, filters, and prioritizes the identified memory spaces prior to initiating a dump of the data within some or all of the identified memory spaces associated with an executing software application.

In step 202, diagnostic data program 200 receives a request to obtain data to diagnose a software application. In an embodiment, a request to obtain data (e.g., a data dump and a related report) to diagnose a software application may include a location for the data dump (e.g., memory, DASD, or magnetic tape), a maximum size for a data dump, and a depth of analysis or scope of tracing associated with identifying shared memory (e.g., cross-memory) spaces. In an example, the scope of a tracing may exclude scheduled by not yet active processes. In some embodiments, diagnostic data program 200 receives a request to obtain data to diagnose a software application 104 based on an administrator of system 101 manually processing a request input by an owner and/or developer of software application 104. Manually input requests for a data dump and a related report may be input via administrative interface 102 of system 101. In other embodiments, diagnostic data program 200 receives a request to diagnose software application 104 based on dynamic automation, a virtual engineer, or other cognitive program processing a request to obtain data to diagnose a software application.

In one embodiment, diagnostic data program 200 receives a request to obtain data to diagnose software application 104 in response to a communication from an owner and/or developer of software application 104, such as input via UI 132 of device 130. In one scenario, diagnostic data program 200 receives a request to diagnose software application 104 in response to a communication associated with an owner and/or developer noting that software application 104 pauses or hangs while executing on system 101. In another scenario, diagnostic data program 200 receives a request to diagnose software application 104 in response to a communication associated with an owner and/or developer noting that software application 104 experiences one or more abnormalities, such as stuck in a loop, a degradation of performance, a corruption of data, and/or a loss of data while executing on system 101. In another embodiment, diagnostic data program 200 receives a request to obtain data to diagnose a software application 104 based on detecting (e.g., by a user, a developer, or an enterprise) a deviation from a service level agreement (SLA) during an execution of software application 104, such as an excessive consumption of resources and not releasing unneeded resources (e.g., a memory leak).

Still referring to step 202 in various embodiments, diagnostic data program 200 receives a request for data to diagnose software application 104 based on an administrator of system 101 responding to an identification of abnormalities associated with the operation of system 101, such as multiple users of system 101 indicating issues with the execution of software application 104. In a further embodiment, diagnostic data program 200 receives a request to obtain data to diagnose one or more problems, issues and/or abnormalities associated with one or more aspects of system 101. In one example, an administrator of system 101 initiates a request for diagnostic data program 200 to do a system dump of system 101 based on receiving communications from various users indicating that aspects of system 101 are not performing as expected (e.g., slower response time than usual, program hangs during certain operations). In another example, an administrator of system 101 initiates a request for diagnostic data program 200 to do a system dump of system 101 based on receiving one or more reports indicating that system 101 is not performing as expected, such networking issues.

In step 204, diagnostic data program 200 identifies a set of information associated with the software application. A set of information associated with software application 104 may include, but is not limited to, executable files, source code, dynamically linked libraries, software containers, and one or more programs of middleware programs 108. Other information may include an indication whether a dump for one or more aspects of a received request is a user-level dump or a system-level dump. In one embodiment, diagnostic data program 200 identifies a set of information associated with software application 104 based on one or more configuration files, templates, and/or provisioning information (not shown) related to software application 104. In an example, diagnostic data program 200 may identify information within a configuration file for software application 104 to identify each aspect (e.g., task, service, executable, code module, etc.) of software application 104. Each aspect of software application 104 may include a flag indicating whether the memory space of an aspect is shared or private (e.g., not included in a cross-memory relationship). If diagnostic data program 200 determines that a memory space is shared, then diagnostic data program 200 may identify further information can indicate which of the one or more other aspects (e.g., PIDs) of software application 104 access the shared memory space.

In another embodiment, diagnostic data program 200 identifies a set of information associated with software application 104 based on the results of one or more initiated traces and/or information derived from one or more function system management functions 109. In an example, diagnostic data program 200 may utilize a memory cataloging function (not shown) within system management functions 109 to identify the memory spaces utilized by software application 104 and to identify the PIDs that utilize each shared or private memory space. In some embodiments, a portion of the set of information associated with software application 104 is input to administrative interface 102 and/or selected from information accessible via administrative interface 102. In an example, a request to diagnose software application 104 may indicate that database operations appear to be related to an abnormality associated with software application 104. If the size of data dump 107 is constrained, then an administrator of system 101 can utilize administrative interface 102 to indicate to diagnostic data program 200 to prioritize (e.g., dictate) analyzing relationships and subsequent dumps of memory spaces related to the PIDs associated with database tasks and services that access one or more databases.

In step 206, diagnostic data program 200 determines a first set of memory spaces utilized by the software application. With respect to some control and/or operating systems, memory spaces within system 101 may be identified by ASIDs. In one embodiment, diagnostic data program 200 determines a first set of memory spaces utilized by software application 104 based on information obtained via system management functions 109, such as a memory cataloging function. The first set of memory spaces may include a master memory space associated with the provisioned memory allocated to an aspect of system 101 to support software application 104. In another embodiment, diagnostic data program 200 determines a first set of memory spaces utilized by software application 104 that include one or more ASIDs that correspond to various servers, subsystems, and/or tasks directly associated with software application 104, such as a list of memory spaces of the PIDs of an enterprise software application.

In some embodiments, diagnostic data program 200 determines a first set of memory spaces and corresponding ASIDs utilized by software application 104 based on the set of information identified in Step 204. In other embodiments, diagnostic data program 200 determines a first set of memory spaces and corresponding ASIDs based on input received via administrative interface 102. In one example, diagnostic data program 200 determines a first set of memory space related to one or more issues and/or abnormalities associated with the operation of system 101, such as accessing data within a SAN. In some scenarios, diagnostic data program 200 determines a first set of memory space based on manually input information. In other scenarios, diagnostic data program 200 determines a first set of memory space based on information automatically input, such as information automatically input via a virtual engineer.

In step 208, diagnostic data program 200 determines a second set of memory spaces based on relationships associated with the software application. One relationship associated with a software application includes sharing/transferring data among two or more processes that execute within different memory spaces, such as cross-memory relationships. Another relationship associated with a software application is based on a chain of calls, services, and/or APIs that perform one or more actions not natively programmed within the software application, such as querying a database and subsequently receiving the results of the query. Other relationships and interactions between memory spaces are associated with internal calls (e.g., software emulation as opposed to direct hardware processing), component interfaces, physical device drivers, virtual device drivers, daemons, etc. that are not directly utilized by a software application or a service within a computing system. Some of the relationships between memory spaces are indirectly related to a software application, such as a memory space of an ancillary process that affects a service utilized by the software application.

In one embodiment, diagnostic data program 200 determines a second set of memory spaces and corresponding ASIDs, based on cross-memory relationships between aspects of software application 104, such as between a portion of executable code of software application 104 and one or more APIs called by software application 104. In another embodiment, diagnostic data program 200 determines a second set of memory spaces and corresponding ASIDs, based on cross-memory relationships. In one scenario, diagnostic data program 200 includes one or more ASIDs in the second set of memory spaces based on identifying one or more cross-memory relationships among services (not shown) that share data among two or more PIDs. In another scenario, diagnostic data program 200 identifies one or more cross-memory relationships based on a flag indicating that a memory space is shared; the PIDs of the sharing entities; and/or information, such as a tuple of information (discussed in further detail with respect to FIG. 3a) obtained from a memory cataloging function.

In some embodiments, diagnostic data program 200 constrains the determination of a second set of memory spaces associated with software application 104 based on information included within the request to diagnose software application 104, such as the depth of analysis. In various embodiments, diagnostic data program 200 also utilizes information included in log files 105 and/or one or more functions of system management functions 109 to identify a memory space that was allocated to a previously executing process or a process to be executed. In an example, diagnostic data program 200 determines that MS 106Z (referring to FIG. 3a) is a shared memory space associated with software application 104. If software application 104 had not initiated the process that utilizes MS 106Z as of the received request to obtain data to diagnose software application 104, then diagnostic data program 200 may exclude MS 106Z from the requested dumps. Alternatively, if software application 104 stopped utilizing the process within MS 106Z as of the received request to obtain data to diagnose software application 104, then diagnostic data program 200 may exclude MS 106Z from the requested dumps.

Still referring to step 208 in a further embodiment, diagnostic data program 200 determines a second set of memory spaces and corresponding ASIDs, based on relationships between executing entities within system 101. In one example, an administrator of system 101 determines that a number of users, executing different software applications, are impacted by a service within middleware programs 108. The administrator of system 101 indicates via administrative interface 102 that diagnostic data program 200 determines the set of shared memory spaces utilized by one or more processes (e.g., parent apps) that call the suspect middleware program and/or the memory spaces associated with one or more processes called by the suspect middleware service. In another example, the administrator of system 101 indicates via administrative interface 102 that diagnostic data program 200 determines a set of shared memory spaces utilized by processes, calls, responses, protocols, etc. of one or more suspect portions of hardware of system 101.

In step 210, diagnostic data program 200 consolidates the data associated with the determined sets of memory spaces associated with the software application. In one embodiment, diagnostic data program 200 aggregates a list of determined memory spaces and corresponding ASIDs associated with the first set of memory spaces and the second set of memory spaces. Diagnostic data program 200 may also include information associated with the determined sets of memory spaces, such as PIDs utilizing a memory space, an ASID of a memory space, an indication of a shared memory space, a relationship between memory spaces, and an analysis depth at which a memory space occurs with respect to an aspect of the received request. In another embodiment, diagnostic data program 200 filters the information associated with the determined sets of memory spaces. In one example, diagnostic data program 200 filters out (e.g., eliminates) duplicate ASIDs or uncalled memory spaces from the sets of determined memory spaces. However, diagnostic data program 200 may include the information associated with the determined sets of memory spaces, such as the memory spaces that were called and released by software application 104 or related processes.

In a further embodiment, diagnostic data program 200 assigns (e.g., dicates) a priority for dumping each memory space of the aggregated and filtered memory spaces. In one example, diagnostic data program 200 may assign dump priority (e.g., an order for dumping) of 1 to the memory spaces of software application 104; a dump priority of 2 to memory spaces related to processes, such as middleware programs called by processes of software application 104; and a dump priority 3 for memory spaces related to other processes called by the middleware programs. In some embodiments, diagnostic data program 200 utilizes information obtained in Steps 202 and/or 204 to determine the granularity of prioritization. In an example, diagnostic data program 200 may obtain information that prioritizes (e.g., specifies) identifying and dumping memory spaces related to database process, such as creating queries, retrieving data, and processing data over processes related to graphics processing.

In various embodiments, diagnostic data program 200 also aggregates, filters, and prioritizes information obtained by interrogating log files 105 and/or executing one or more aspects of system management program 109 for other information associated with the determined sets of memory spaces. The information obtained by diagnostic data program 200 may include process traces and changes in provisioning information (e.g., a growth of the size of a memory space) during the execution of software application 104. Diagnostic data program 200 may utilize a post-processing program (not shown) to structure the obtained data associated with memory spaces to generate a dump summary report.

In step 212, diagnostic data program 200 initiates dumps of data associated with the request to diagnose the software application. Diagnostic data program 200 initiates to dump data within a memory space by utilizing a command of the operating system (not shown) or a function of system management functions 109. In addition, diagnostic data program 200 obtains information from one or more files within log files 105 that are associated with memory spaces to dump, the execution of software application 104, and/or the operations of system 101. In some embodiments, diagnostic data program 200 initiates user-level dumps of data. In other embodiments, diagnostic data program 200 initiates system-level dumps of data.

In one embodiment, diagnostic data program 200 initiates dumps of data for the consolidated memory spaces of Step 210. In another embodiment, if diagnostic data program 200 determines that one or more constraints (e.g., a maximum size for dump 107) are associated with the received request to obtain data to diagnose software application 104, then diagnostic data program 200 includes the prioritization information to select a memory space or group of memory spaces to dump.

In step 214, diagnostic data program 200 stores the dumps of data related to the received request. In one embodiment, diagnostic data program 200 spools (e.g., stores) the dumps of data of the determined memory spaces to data dump 107. In various embodiments, diagnostic data program 200 utilizes high-speed captures and aggregation of the dumped data in an encoded format, as opposed to basic text. Diagnostic data program 200 may subsequently utilize specialized formatters or post-processors (not shown) to utilize, parse, format, and extract data and information within dumps. In another embodiment, diagnostic data program 200 spools the dumps of data of the determined memory spaces to data dump 107 and can utilize a specialized formatter to generate a dump summary report (not shown) that includes information associated with the processes, services, PIDs, ASIDs, etc. of the dumped memory spaces as diagnostic data program 200. In addition, upon completing the dumps of the determined memory spaces, diagnostic data program 200 can include the generated dump summary report within data dump 107.

In some embodiments, in response to completing the dumps of the determined memory spaces, diagnostic data program 200 stores data dump 107 to persistent storage. In some scenarios, diagnostic data program 200 utilizes a data compression program (not shown) to reduce the size of data dump 107. In one scenario, diagnostic data program 200 maintains data dump 107 on system 101. Diagnostic data program 200 may migrate data dump 107 to a lower-cost form of persistent storage, such as magnetic tape. In other scenarios, diagnostic data program 200 utilizes network 120 to transfer, at least a copy of data dump 107 to device 130.

Figure 3B:
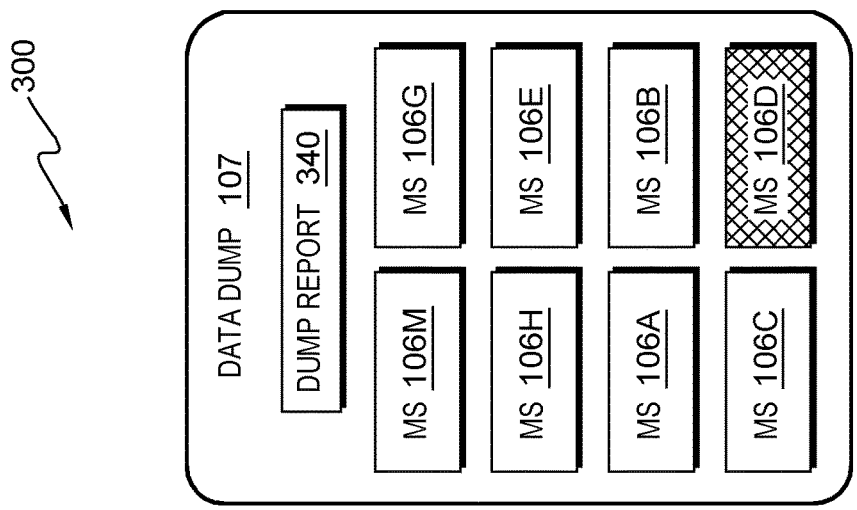
FIG. 3b depicts an illustrative result of a diagnostic data program determining the memory spaces utilized by software application and associated processes, and generating a dump report, in accordance with an embodiment of the present invention.
Figure 3A:
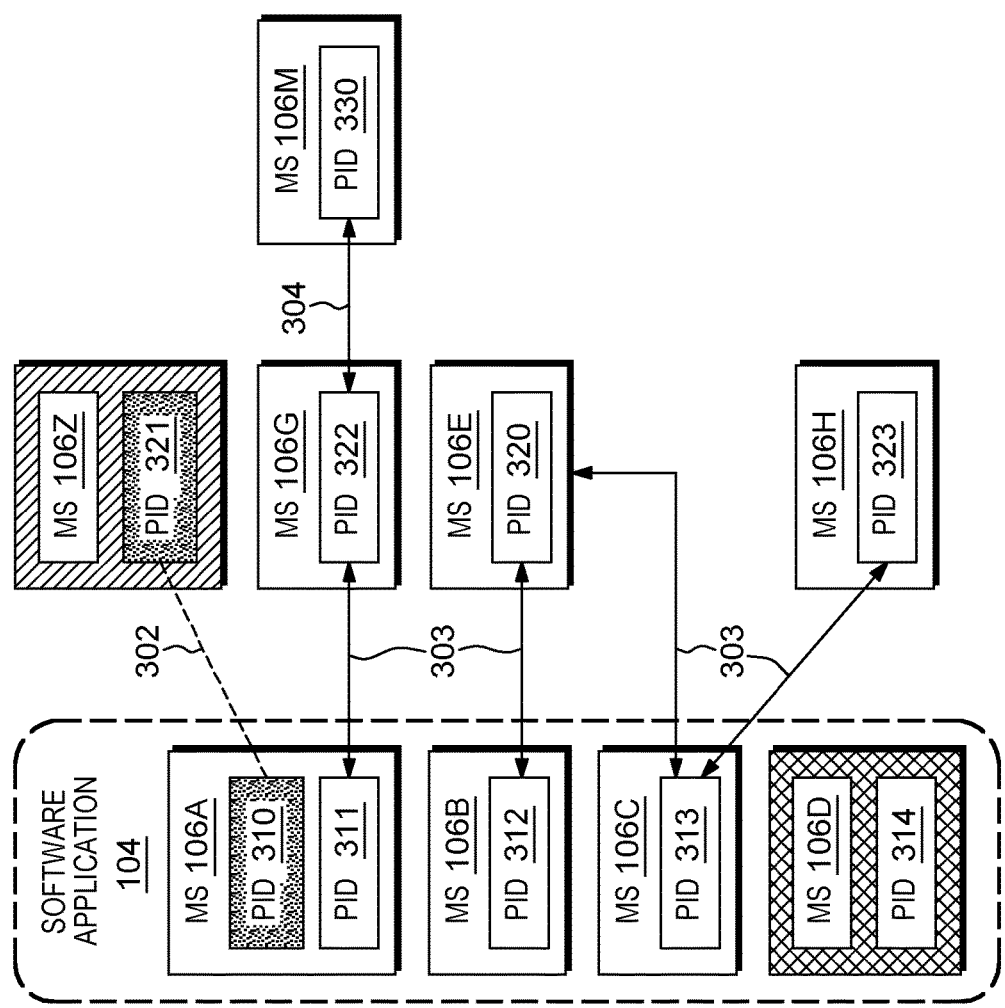
FIG. 3a depicts an illustrative example of identifying additional memory spaces based on cross-memory relationships, in accordance with an embodiment of the present invention.

FIG. 3*a* is an illustrative example of diagnostic data program 200 responding to a request to obtain data to diagnose software application 104 by initiating data dumps. FIG. 3*a* is a snapshot of the processes of software application 104 and processes (e.g., program, service, tasks, etc.) utilized by software application 104 at a point in time corresponding to diagnostic data program 200 receiving to a request to obtain data to diagnose software application 104.

Diagnostic data program 200 determines additional memory spaces to dump based on cross-memory relationships among processes of software application 104 and subsequent calls that interact with other processes within other memory spaces, in accordance with an embodiment of the present invention. In the illustrative example, software application 104 includes five process indicated by PIDs 310, 311, 312, 313, and 314. The five processes of software application 104 execute within four memory spaces (MSs). In this illustrative example, system 101 provisions four memory spaces for processes of software application 104, MS 106A hosts PID 310 and PID 311, MS 106B hosts PID 312, MS 106C hosts PID 313, and MS 106D hosts PID 314.

Within FIG. 3*a*, memory space with cross-memory relationships are identified by boxes without shading. Unidentified memory spaces, such as MS 106Z are indicated by a diagonal hash shading. Identified memory spaces, such as MS 106D, without a cross-memory relationship, are indicated by stipple shading. In an embodiment, diagnostic data program 200 determines that MS 106A, 106B, 106C, and 106D are the first set of memory spaces utilized by a software application (referring to FIG. 2, step 206).

MS 106A hosts PID 310 and PID 311. PID 310 can dynamically establish and revoke a connection and/or the activation of PID 321 of MS 106Z. In this example, if PID 310 is not active (depicted in reverse tone), then PID 321 is also not active (reverse tone). In addition, dashed line 302 indicates that as of the received request for a dump data associated with software application 104 (referring to FIG. 2, step 202), that PID 310 is not communicating with PID 321. In an embodiment, without PID 310 communicating with PID 321, diagnostic data program 200 does not identify a cross-memory relationship between MS 106A and MS 106Z. However, diagnostic data program 200 can identify MS 106D because MS 106D is included in the provisioning for software application 104.

The active child processes or processes linked to processes of software application 104 are PID 320, PID 322, and PID 323. Instances of element 303 (solid lines with double arrowheads) indicate active relationships, such as cross-memory relationships between the processes of application 104 and active child processes (e.g., linked processes). In one example, PID 311 interfaces with PID 322, PID 312, and PID 313 both interface with PID 320, and PID 313 interfaces with PID 323. In another example, an OS (not shown) of system 101 may identify a cross-memory relationship based on a tuple of information (e.g., a home memory space (HMS), a primary memory space (PMS), and a secondary memory space (SMS)) included in one or more catalogs of memory within system 101. In this example, MS 106A may be represented by the tuple of HMS106A, PMS106A, SMS106A; similarly, MS 106G may be represented by the tuple of HMS106A, PMS106G, SMS106A; and MS 106M may be represented by the tuple of HMS106A, PMS106M, SMS106G.

As depicted, PID 320 executes within MS 106E, PID 323 executes within MS 106H, and PID 322 executes within MS 106G. In addition, PID 330 is a child process associated with PID 322. Similarly, element 304 (solid lines with double arrowheads) indicated an active relationship between PID 322 and PID 330. Therefore, in an embodiment, diagnostic data program 200 can identify MS 106M based on the cross-memory relationship with MS 106G.

In an embodiment, diagnostic data program 200 determines that MS 106E, MS 106G, MS 106H, and MS 106M are the second set of memory spaces associated with a software application (referring to FIG. 2, step 208).

FIG. 3*b* is an illustrative example of the output of an instance of diagnostic data program 200. Referring to FIG. 2, Step 210, diagnostic data program 200 aggregates and filters the determined memory spaces. MS 106E has cross-memory relationships with two other memory spaces, MS 106B and MS 106C. However, diagnostic data program 200 consolidates/filters these two references and initiates a single dump of MS 106E (referring to FIG. 2, steps 210 and 212). MS 106Z (diagonal hash shading) is excluded based on the lack of an established relationship between PID 310 and PID 321. Conversely, MS 106D is included based on the identification of MS 106D within the determined first set of memory spaces (referring to FIG. 2, step 206).

Therefore, diagnostic data program 200 stores the data dumps from MS 106A, 106B, 106C, 106D, 106E, 106H, 106G, and 106M to data dump 107. In addition, diagnostic data program 200 can generate dump report 340 (e.g., a data dump summary report). Dump report 340 includes the ASID's of MS 106A, 106B, 106C, 106D, 106E, 106H, 106G, and 106M, Dump report 340 also includes the PIDs, the size, and the cross-memory relationships associated with each utilized memory space. Dump report 340 may also include information obtained from one or more files of log files 105 associated with the execution of software application 104, such as the execution time, execution events, provisioning information for processes associated with or utilized by software application 104. In addition, dump report 340 may include trace information that indicates whether PID 310 established and revoked a relationship with PID 321. If the relationship between PID 310 and PID 321 had been established and then revoked, and if MS 106Z had not been released back to system 101, then MS 106Z may still store data that can be dumped.

In another embodiment, in response to post-processing and reviewing of dump report 340 a user of device 130 may include additional information within the next request to obtain data to diagnose software application 104. The additional information can flag the process of software application 104 that was previously associated with PID 310 and trace the one or more subsequent processes that are called by the flagged process. This additional information can be included in the set of information associated with software application 104 (referring to FIG. 2, Step 204). As such, this additional information can be utilized by an administrator of system 101 to trap (e.g., identify and lock) the memory space of the process that is dynamically called and released by a process of software application 104 for inclusion in the determined second set of memory spaces associated with software application 104. Thereby, diagnostic data program 200 can dump one or more additional memory spaces to another instance of data dump 107 during a subsequent execution of software application 104.

Figure 4:
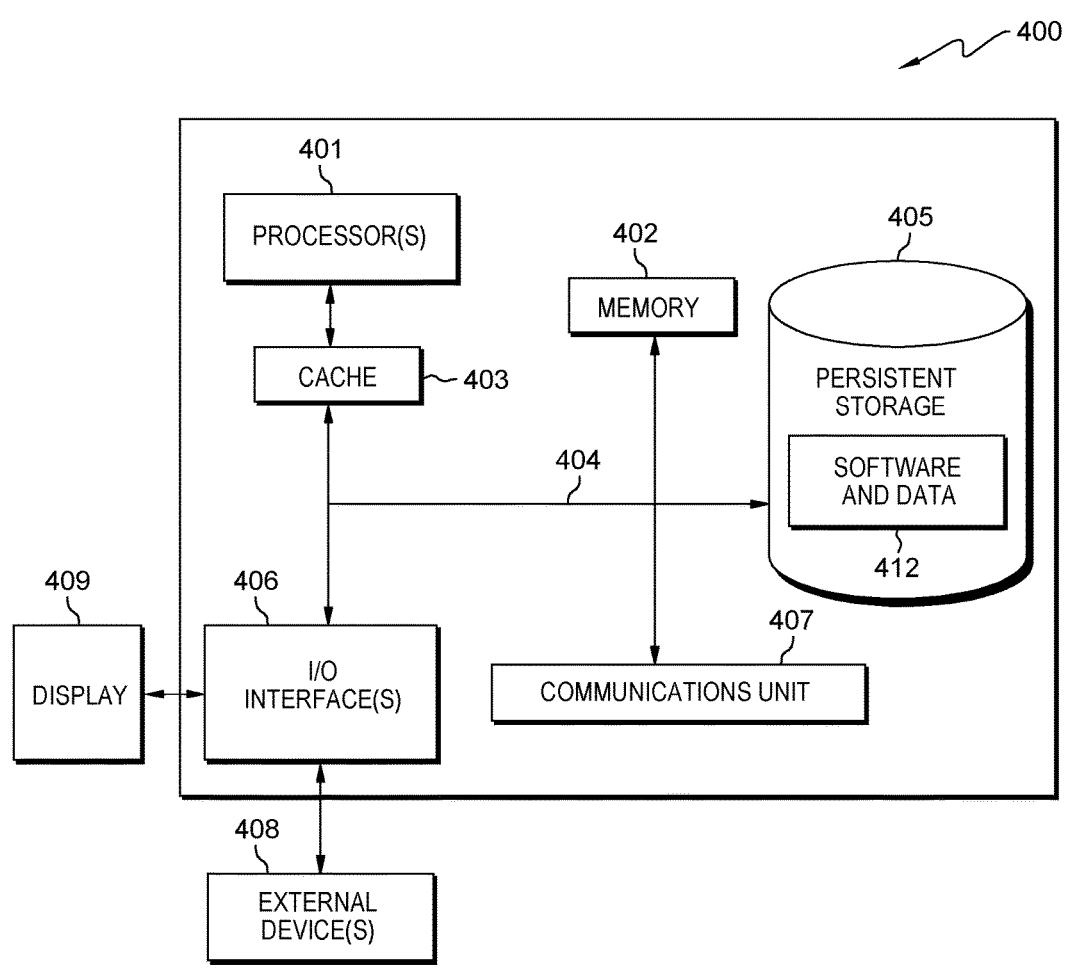
FIG. 4 is a block diagram of components of a computer, in accordance with an embodiment of the present invention.

FIG. 4 depicts a block diagram of computer system 400, which is representative of system 101 and device 130. Computer system 400 is an example of a system that includes software and data 412. Computer system 400 includes processor(s) 401, memory 402, cache 403, persistent storage 405, communications unit 407, input/output (I/O) interface(s) 406, and communications fabric 404. Communications fabric 404 provides communications between memory 402, cache 403, persistent storage 405, communications unit 407, and I/O interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information. In an embodiment, with respect to system 101, MS 106A thru MS 106Z are included in a portion of memory 402. In an embodiment, with respect to system 101, a portion storage 103 is included within persistent storage 405. In some embodiments, with respect to system 101, an instance of data dump 107 is included in persistent storage 405. In other embodiments, some instances of data dump 107 are included in memory 402. With respect to device 130, storage 133 is included within persistent storage 405.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to system 101, software and data 412 includes: administrative interface 102, software application 104, log files 105, middleware programs 108, system management functions 109, diagnostic data program 200, and various programs (not shown). In an embodiment, software and data 412 includes an instance of data dump 107. With respect to device 130, software and data 412 includes: UI 132 and various programs and data (not shown).

Communications unit 407, in these examples, provides for communications with other data processing systems or devices, including resources of system 101 and device 130. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Software and data 412 used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor. Display 409 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additionally, the phrase "based on" should be interpreted to mean "based, at least in part, on."

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for obtaining data to debug an issue that affects a software application, the method comprising:
   receiving, by one or more computer processors, a request to obtain data associated with an issue that affects an executing software application;
   determining, by one or more computer processors, a set of memory spaces utilized by the executing software application and one or more processes supporting the executing software application, wherein determining the set of memory spaces utilized by the executing software application and one or more processes supporting the executing software application further comprises:
      determining, by one or more computer processors, a first set of memory spaces utilized by the executing software application; and
      determining, by one or more computer processors, a second set of memory spaces utilized by the one or more processes supporting the executing software application, wherein the second set of memory spaces are determined based on (i) one or more relationships between the executing software application and the one or more processes supporting the executing software application, and (ii) one or more relationships among the one or more processes supporting the executing software application;
   initiating, by one or more computer processors, a dump function to obtain data within the memory spaces of the determined set of memory spaces; and
   storing, by one or more computer processors, the data related to the dumped set of memory spaces, wherein storing the data related to the dumped set of memory spaces includes (i) high-speed capture and aggregation of data to volatile memory and (ii) spooling data within volatile memory to persistent memory.

2. The method of claim 1, wherein the determined set of memory spaces are hosted within a computing system that hosts the executing software application and the one or more processes that support the executing software application.

3. The method of claim 1, wherein relationships are determined based on information selected from the group consisting of a memory cataloging function, a process tracing function, a process tree, provisioning information for a process, indications associated with a memory space, and sharing data among two or more processes.

4. The method of claim 1, wherein initiating the dump function to obtain data within the memory spaces of the determined set of memory spaces further comprises:
   filtering, by one or more computer processors, the determined set of memory spaces to remove duplicate references of a memory space, prior to dumping the set of determined set of memory spaces.

5. The method of claim 1, further comprising:
   identifying, by one or more computer processors, that the request to obtain data associated with an issue that affects the executing software application includes one or more dictates, wherein the one or more dictates are selected from the group consisting of a maximum size for the data related to the dumped set of memory spaces, a scope of tracing associated with determining memory spaces, specifying one or more type of processes to dump, and an order to dump the determined set of memory spaces; and
   determining, by one or more computer processors, at least one memory space of the set of determined memory spaces to dump utilizing the dump function based, at least in part, on the identified one or more dictates associated with the request to obtain data associated with the issue that affects the executing software application.

6. The method of claim 1, wherein the issue that affects a software application is selected from the group consisting of a hang, a loop that is stuck, a degradation in performance, a loss of data, a corruption of data, a class of errors not detected software of a computing system, and a class of errors not recognized by the software of the computing system.

7. The method of claim 1, wherein the one or more processes that support the executing software application is selected from the group consisting of one or more services of an operating system services, one or more kernel tasks, one or more daemons, and one or more middleware programs.

8. A computer program product for obtaining data to debug an issue that affects a software application, the computer program product comprising:
   one or more computer readable storage media and program instructions stored on the one or more computer readable storage media, the program instructions readable/executable by one or more computer processors and further comprising:
   program instructions to receive a request to obtain data associated with an issue that affects an executing software application;
   program instructions to determine a set of memory spaces utilized by the executing software application and one or more processes supporting the executing software application, wherein the program instructions to determine the set of memory spaces utilized by the executing software application and one or more processes supporting the executing software application further comprise:
      program instructions to determine a first set of memory spaces utilized by the executing software application; and
      program instructions to determine a second set of memory spaces utilized by the one or more processes supporting the executing software application, wherein the second set of memory spaces are determined based on (i) one or more relationships between the executing software application and the one or more processes supporting the executing software application, and (ii) one or more relationships among the one or more processes supporting the executing software application;
   program instructions to initiate a dump function to obtain data within the memory spaces of the determined set of memory spaces; and
   program instructions to store the data related to the dumped set of memory spaces, wherein program instructions to store the data related to the dumped set of memory spaces includes (i) program instruction for high-speed capture and aggregation of data to volatile memory and (ii) program instructions to spool data within volatile memory to persistent memory.

9. The computer program product of claim 8, wherein relationships are determined based on information selected from the group consisting of a memory cataloging function, a process tracing function, a process tree, provisioning information for a process, indications associated with a memory space, and sharing data among two or more processes.

10. The computer program product of claim 8, wherein program instructions to initiate the dump function to obtain data within the memory spaces of the determined set of memory spaces further comprise:
    program instructions to filter the determined set of memory spaces to remove duplicate references of a memory space, prior to dumping the set of determined set of memory spaces.

11. The computer program product of claim 8, further comprising:
    program instruction to identify that the request to obtain data associated with an issue that affects the executing software application includes one or more dictates, wherein the one or more dictates are selected from the group consisting of a maximum size for the data related to the dumped set of memory spaces, a scope of tracing associated with determining memory spaces, specifying one or more type of processes to dump, and an order to dump the determined set of memory spaces; and
    program instructions determine at least one memory space of the set of determined memory spaces to dump utilizing the dump function based, at least in part, on the identified one or more dictates associated with the request to obtain data associated with the issue that affects the executing software application.

12. The computer program product of claim 8, wherein the issue that affects a software application is selected from the group consisting of a hang, a loop that is stuck, a degradation in performance, a loss of data, a corruption of data, a class of errors not detected software of a computing system, and a class of errors not recognized by the software of the computing system.

13. A computer system for obtaining data to debug an issue that affects a software application the computer system comprising:
    one or more computer processors;
    one or more computer readable storage media;
    program instructions stored on the computer readable storage media for reading/execution by at least one of the one or more computer processors, the program instructions further comprising:
        program instructions to receive a request to obtain data associated with an issue that affects an executing software application;
        program instructions to determine a set of memory spaces utilized by the executing software application and one or more processes supporting the executing software application, wherein the program instructions to determine the set of memory spaces utilized by the executing software application and one or more processes supporting the executing software application further comprise:
            program instructions to determine a first set of memory spaces utilized by the executing software application; and
            program instructions to determine a second set of memory spaces utilized by the one or more processes supporting the executing software application, wherein the second set of memory spaces are determined based on (i) one or more relationships between the executing software application and the one or more processes supporting the executing software application, and (ii) one or more relationships among the one or more processes supporting the executing software application;
        program instructions to initiate a dump function to obtain data within the memory spaces of the determined set of memory spaces; and
        program instructions to store the data related to the dumped set of memory spaces, wherein program instructions to store the data related to the dumped set of memory spaces includes (i) program instruction for high-speed capture and aggregation of data to volatile memory and (ii) program instructions to spool data within volatile memory to persistent memory.

14. The computer system of claim 13, wherein relationships are determined based on information selected from the group consisting of a memory cataloging function, a process tracing function, a process tree, provisioning information for a process, indications associated with a memory space, and sharing data among two or more processes.

15. The computer system of claim 13, wherein program instructions to initiate the dump function to obtain data within the memory spaces of the determined set of memory spaces further comprise:
    program instructions to filter the determined set of memory spaces to remove duplicate references of a memory space, prior to dumping the set of determined set of memory spaces.

16. The computer system of claim 13, further comprising:
    program instructions to identify that the request to obtain data associated with an issue that affects the executing software application includes one or more dictates, wherein the one or more dictates are selected from the group consisting of a maximum size for the data related to the dumped set of memory spaces, a scope of tracing associated with determining memory spaces, specifying one or more type of processes to dump, and an order to dump the determined set of memory spaces; and
    program instructions determine at least one memory space of the set of determined memory spaces to dump utilizing the dump function based, at least in part, on the identified one or more dictates associated with the request to obtain data associated with the issue that affects the executing software application.

17. The computer system of claim 13, wherein the issue that affects a software application is selected from the group consisting of a hang, a loop that is stuck, a degradation in performance, a loss of data, a corruption of data, a class of errors not detected software of a computing system, and a class of errors not recognized by the software of the computing system.

\* \* \* \* \*